3,068,077
CRYSTALLIZERS
Johan F. Witte, Amsterdam, Netherlands, assignor to Werkspoor N.V., Amsterdam, Netherlands, a company of the Netherlands
Filed May 4, 1960, Ser. No. 26,821
Claims priority, application Netherlands May 9, 1959
1 Claim. (Cl. 23—273)

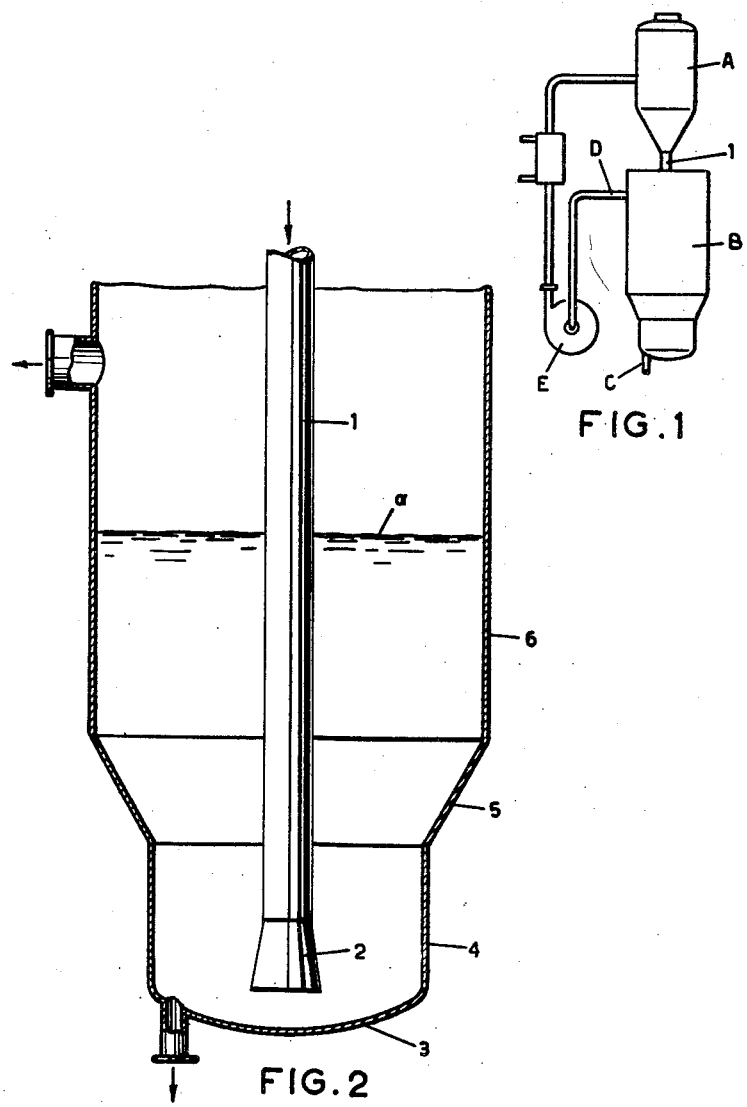

The invention relates to a crystallizer consisting of a vertical vessel to which a supersaturated solution is fed in continuous operation through a vertical pipe extending into the vicinity of the base of the vessel, the vessel comprising an outlet at the base or in the vicinity thereof for the continuous discharge of the crystalline mass and said vessel being provided with an overflow orifice for the mother liquor.

In a crystallizer of this type, the supersaturated solution conducted into the vessel at the bottom thereof moves upwardly, at such a speed, in fact, that the crystals are kept in a suspended state in the vessel until they have grown sufficiently to escape through the outlet provided at the base of the vessel.

The supersaturation of the solution to be crystallized is obtained in this case outside the vessel by heating, cooling, concentration or by a chemical reaction, i.e. in such manner that the supersaturated solution obtained, in which only a few crystal nuclei occur, is metastable, so that the solution does not give up its supersaturation through stirring or through contact with parts of the vessel, but only allows crystals already present in the vessel to grow or forms new crystal nuclei. As the capacity of such a crystallizer is directly proportional to the quantity of solution passed through the vessel and to its degree of supersaturation, it is advisable to make the saturation as high as possible.

However, a limit is set to the supersaturation of the solution to be conducted into the vessel not only by the requirement that it must be within the metastable range, but also by the influence of the flow of the solution and of the crystals in the vessel.

The crystals present in the crystal bed in suspension vary in size and the velocity of the upwardly flowing solution which is necessary in order to keep the crystals in suspension thereby has both a top limit and a bottom limit. The minimum velocity which is necessary in order to keep the crystals in suspension is, of course, dependent on the size of the crystals and is all the greater according as the crystals are larger. The minimum velocity of the solution which is necessary in order to entrain the crystals is many times greater but also depends on the size of the crystals.

It will be apparent from the foregoing that with greatly varying dimensions of the crystals in the suspended bed the upward velocity of the supersaturated solution in the vessel may be allowed to vary to a smaller extent than in the case of a crystal bed in which the crystals vary only little in size. The permissible range of the upward velocities of the solution will therefore be all the smaller according as the crystals vary more considerably in size. In crystallizers of the type mentioned heretofore known, a rather large number of very small crystal nuclei are moreover formed in the mainly cylindrical vessel and the maximum size of the crystals which are discharged at the outlet thereby also remains limited.

To obtain coarser crystals, it has been proposed to widen the vessel conically in the upward direction. Since, with this form of the vessel, the crystals which still happen to be kept in suspension in the narrowest part of the vessel would settle higher up in the vessel, a certain graduation according to the size of the crystals occurs in the crystal bed. Such a graduation in the size of the crystals is also obtained to some extent in a cylindrical vessel. The size of the crystals discharged at the outlet of the vessel shows only a slight fluctuation.

The object of the invention is so to improve the crystallizer that it is possible to operate with a higher degree of supersaturation of the solution to be crystallized and larger crystals can be obtained. According to the invention, the lower part of the vessel at the place where the feed pipe opens is cylindrical or almost cylindrical and the vessel also retains this cylindrical shape for some distance thereabove, to widen conically thereafter. With this construction, the supersaturated solution flowing upwardly at the bottom of the vessel retains the velocity necessary for obtaining larger crystals in the cylindrical portion of the vessel, to decrease its velocity in the following conical portion to a value for keeping the smaller crystals in a suspended state.

The invention will be described in detail with reference to the drawing. In the drawing:

FIG. 1 is a diagram of a crystallization apparatus comprising an evaporator and a crystallizer according to the invention, and FIG. 2 is a vertical section of this crystallizer on a larger scale.

In FIG. 1, the reference A denotes an evaporator in which a supersaturated solution is produced by evaporation of the mother liquor. This supersaturated solution passes through the pipe 1 into the crystallizer B, from which the crystalline mass formed is discharged at C and the mother liquor is returned to the evaporator A at D by means of a pump E.

The pipe 1 is the feed pipe of the crystallizer and opens at a conical nozzle or mouthpiece 2 in the vicinity of the base 3 of the vessel. The solution therefore flows upwardly in the crystallizer. The lower part of the vessel is formed by a cylindrical ring 4 the height of which may, for example, be four fifths of the diameter of said ring. To the cylindrical part 4 there is connected a conically widening portion 5 which may merge if required into a cylindrical part 6. The diameter of the part 6 may, for instance, be 1.4 times the diameter of the lower part 4 of the vessel. It has been found from tests that there is formed in the lower cylindrical part 4 of the vessel a suspended crystalline mass whose screen analysis is the same throughout and in which there are no crystals of very small size present. In the other part 6 of the vessel, the crystal bed extends as far as the level $a$ and here the crystals are much finer. As there is a rather sudden transition from the cylindrical part 4 to the conical part 5 of the vessel, a rather sharp division between the coarse crystals in the part 4 and the finer crystals in the parts 5, 6 is also obtained. To be sure, between the parts 4 and 5 there is in the crystalline mass a small transitional zone the height of which is approximately one tenth of the diameter of the cylindrical part 4 and in which the percentage of crystals of much smaller size is substantially larger. The extent of the mixing of the small crystals in the part 5 and the coarse crystals in the cylindrical part 4 is influenced by the divergence of the widening part 5 and is all the smaller according as the centre angle of this part is larger.

In the crystallisation of common salt in the crystallizer according to the invention, reduced formation of nuclei has been observed, so that the supersaturation of the solution decreases more slowly. In consequence, a coarser product is obtained and the solution to be crystallized can be fed to the vessel with a higher degree of supersaturation. Owing to this, a smaller vessel can be used for the same capacity. Added to this is the fact that the cylindrical part 4 has smaller dimensions than the upper part 6 and high demands are made of this very part 4 as regards the nature of the material and the properties of the surface, since the supersaturation of the solution is greatest in this part.

It is observed that the vessel does not require to have a round cross-section, but may also be non-circular. If required, the vessel may be entirely conical above the cylindrical part 4 as far as the top edge. The part 4 may also be slightly conical, the area of the cross-section at the upper margin of the part 4 being then about 10% larger than the area at the mouth 2 of the feed pipe. Of course, a rather sudden transition is always necessary between the part 4 and the adjacent conical part 5.

What is claimed is:

A crystallizer to which a saturated solution as the mother liquor is fed in continuous operation, comprising a vertical vessel having a shallow, dish shaped bottom wall joined at its periphery to a substantially vertical cylindrical wall, a vertical pipe for the supply of said solution and extending downwardly within the vessel to open at a level near said bottom wall, an outlet in the bottom wall of the vessel for the continuous discharge of the crystalline mass, and an overflow orifice provided in a side wall of the vessel for the discharge of the mother liquor, said cylindrical wall starting substantially at said level of the lower, open end of said supply pipe and extending to a height thereabove equal to about four fifths of the diameter of said cylindrical wall, said vessel widening upwardly above said cylindrical wall to form a conical part and an upper cylindrical part extending above said conical part, and said outlet being formed in said bottom wall near its junction with said cylindrical wall and displaced laterally from the lower end of the supply pipe.

References Cited in the file of this patent

FOREIGN PATENTS

| | | |
|---|---|---|
| 503,594 | Germany | July 24, 1930 |
| 1,036,814 | Germany | Sept. 14, 1955 |